US005485394A

United States Patent [19]

Murata et al.

[11] Patent Number: 5,485,394
[45] Date of Patent: Jan. 16, 1996

[54] FAULT LOCATION METHOD FOR A PARALLEL TWO-CIRCUIT TRANSMISSION LINE WITH N TERMINALS

[75] Inventors: Kenji Murata; Kazuo Sonohara; Susumu Ito; Kyoji Ishizu, all of Osaka; Tokuo Emura, Kyoto, all of Japan

[73] Assignees: Nissin Electric Company, Limited, Kyoto; The Kansai Electric Power Co., Inc., Osaka, both of Japan

[21] Appl. No.: 443,765

[22] Filed: May 18, 1995

Related U.S. Application Data

[63] Continuation of Ser. No. 208,034, Mar. 9, 1994, abandoned, which is a continuation of Ser. No. 707,907, May 30, 1991, abandoned.

[30] Foreign Application Priority Data

May 31, 1990 [JP] Japan .................................. 2-143824
May 31, 1990 [JP] Japan .................................. 2-143825

[51] Int. Cl.$^6$ ................................................ G01R 31/00
[52] U.S. Cl. ........................... 364/483; 364/480; 364/481; 324/521
[58] Field of Search ................................ 364/480, 481, 364/483; 324/521, 522, 525; 361/65, 93, 107

[56] References Cited

U.S. PATENT DOCUMENTS

| 4,107,778 | 8/1978 | Nii et al. ............... | 364/483 X |
| 4,313,169 | 1/1982 | Takagi et al. ........... | 364/492 |
| 4,455,612 | 6/1984 | Girgis et al. ........... | 364/483 |
| 4,800,509 | 1/1989 | Nimmersjo ............. | 364/483 X |
| 4,812,995 | 3/1989 | Girgis et al. ........... | 364/483 X |
| 4,985,843 | 1/1991 | Kotani ................... | 364/483 |
| 5,072,403 | 12/1991 | Johns ................... | 364/483 X |

FOREIGN PATENT DOCUMENTS 2-19779 1/1990 Japan .
2-154168 6/1990 Japan .

OTHER PUBLICATIONS

Patent Abstract of Japan, vol. 14, No. 162 (P–1029) 29 Mar. 1990.
Patent Abstract of Japan, vol. 14, No. 402 (P–1099) 30 Aug. 1990.
Soviet Inventions Illustrated, Section EI, Week 8640, 16 Oct. 1986, Derwent Publications Ltd., London, Gb, Class S.
Soviet Inventions Illustrated, Section EI, Week 9007, 28 Mar. 1990, Derwent Publications Ltd., London, GB, Class S.
Soviet Inventions Illustrated, Section EI, Week 7517, Derwen Publications Ltd., London, GB, Class S.

*Primary Examiner*—Emanuel T. Voeltz
*Assistant Examiner*—Thomas Peeso
*Attorney, Agent, or Firm*—Finnegan, Henderson, Farabow, Garrett & Dunner

[57] ABSTRACT

A method of locating a fault point in a parallel two-circuit transmission line in an n-terminal system. When a single fault occurs at one place in one circuit of the transmission line and when a multiple fault occurs at the same place in the two circuits, a distance to the fault may be calculated by the method of this invention. The method comprises the steps of transforming the transmission line into a T three-terminal parallel two-circuit transmission line circuit having three branches, calculating a value representing a length of one of the three branches on the basis of differential currents flowing into the branch points of the transmission line, determining if that value represents the distance from a terminal connected to the branch point to the fault point, employing the value as the distance to the fault point if the value represents such a distance, repeating the value calculation and determination for the other two branches if the value does not represent the distance to the fault, determining a next branch point for which to perform equivalent transformation with respect to, and repeating the previous steps until the fault is found.

6 Claims, 10 Drawing Sheets

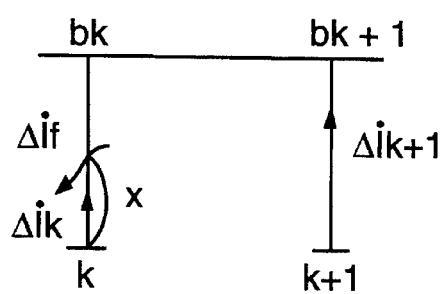
FIG. 4(a)
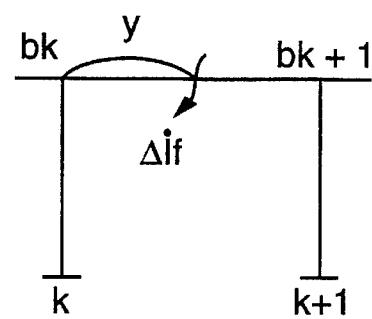
FIG. 4(b)
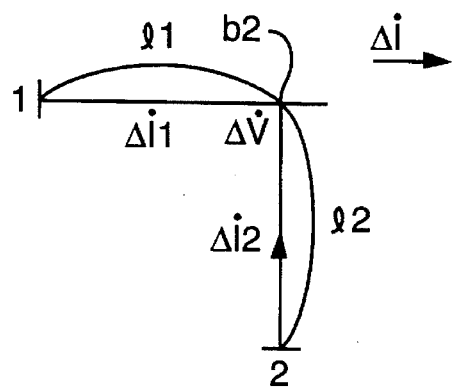
FIG. 5(a)
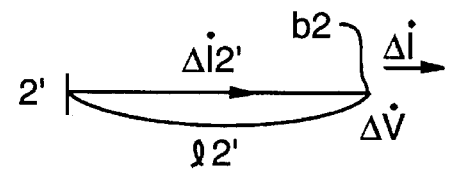
FIG. 5(a')
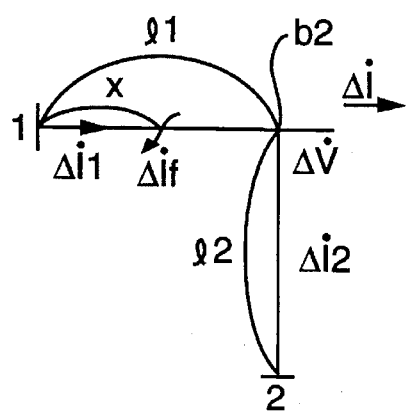
FIG. 5(b)
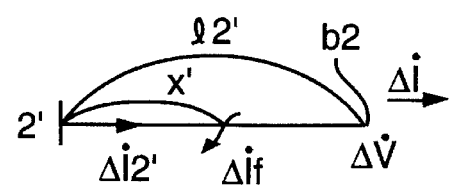
FIG. 5(b')

FIG. 5(c')

FAULT LOCATION METHOD FOR A PARALLEL TWO-CIRCUIT TRANSMISSION LINE WITH N TERMINALS

This application is a continuation of application Ser. No. 08/208,034, filed Mar. 9, 1994, which is a continuation of application Ser. No. 07/707,907 filed May 30, 1991, both now abandoned.

BACKGROUND OF THE INVENTION

1. Field of the Invention

The present invention relates to a fault location method of a single fault or multiple faults of a parallel two-circuit transmission line with n terminals.

2. Discussion of the Related Art

Electric power is usually transmitted between electric power substations by the use of a parallel two-circuit transmission line. This transmission line is subject to various types of faults due to external factors (e.g. insulation breaks due to lightning strikes or contacts with birds or trees). Most of the faults are single phase groundings. A fault-locating operation is used where locating the fault by inspection is difficult, such as in mountainous regions. The types of faults include (1) a fault at one location on one circuit, (2) faults at different locations on one circuit, (3) faults at the same location on both circuits, (4) faults at different locations on the two circuit. Faults of type (1) are generally said to be a "single fault" and represent the majority of faults. Faults of types (2)-(4) are referred to as multiple faults, the majority of which are of type (3). The present invention relates to faults of types (1) and (3).

A variety of ground fault location have been proposed. For example, a type (1) fault may be located with a method in which zero-phase currents $I_{01}$ and $I_{02}$ of the respective circuits of a two-terminal parallel two-circuit transmission line are detected to produce a shunt current ratio of the zero-phase currents defined by:

$$2I_{0i}/(I_{01}+I_{02}) \text{ where } i=1 \text{ or } 2,$$

and the distance from the sending end to a single phase ground fault is calculated on the basis of the shunt current ratio of the zero-phase currents and the total length of the transmission line.

FIG. 8 illustrates the above-described method. A Y-Δ transformer c is disposed with its neutral point grounded via a high resistance b at a sending end a, and a Y-Δ transformer e without grounding is disposed at a receiving end d. The transformers c and e are connected to bus lines g1 and g2, respectively, between which f1 and f2 of a two-circuit transmission line having a length l are connected. FIG. 9 shows a zero-phase equivalent circuit of FIG. 8, where the zero-phase current of the circuit f1 is $I_{01}$, the zero-phase current of the circuit f2 is $I_{02}$, the zero-phase voltage of the bus g1 is Vo, the zero-phase voltage of the ground fault point is Vof, the zero-phase-sequence impedance per unit length is $Z_o$, and the zero sequence mutual impedance between the circuits is $Z_m$.

With the aforementioned parallel two-circuit transmission line, we assume that a single phase ground fault occurs at a distance x from the sending end and a ground fault current $I_{0f}$ is flowing from the fault point to the ground. The distance x can be determined by calculating the zero-phase current ratio. That is, the single phase ground fault point can be located on the basis of only the zero-phase currents $I_{01}$ and $I_{02}$ of the circuits f1 and f2, respectively. The above-mentioned single phase ground fault calculation method is an easy way of locating the fault because the distance from the sending end to the ground fault point is calculated only on the basis of the shunt current ratio of the zero-phase currents detected from the respective circuits. However, this method cannot be directly applied to the fault localization of a single phase ground fault in a three-terminal system where the transmission circuits are branched such that one end of each branch is loaded.

A fault-localization method such that by the use of the shunt current ratio of the zero-phase currents a fault point which occurs in a single phase of a parallel two-circuit transmission line with three terminals in a resistor grounded neutral system can be located has been proposed in Japanese Patent Application No. 63-169739. In this method, correction factors are precalculated based on the distance from the sending end to a single phase ground fault point so that the distance from the sending end to the ground fault point is calculated, or correction factors are precalculated based on the distance from a branch of the two-circuit transmission line to a single phase ground fault point so that the distance from the branch to the ground fault point is calculated.

However, this method utilizes only the information from the sending one end, thus, may only be applied to the simple faults of type (1).

A method of fault-localization for a two-terminal parallel two-circuit transmission line in a resistance grounded neutral system and for a three-terminal parallel two-circuit transmission line has been proposed in Japanese Patent Application No. 63-307612.

In this method, the zero-phase equivalent circuit of a three-terminal parallel two-circuit transmission line of the resistance grounded neutral system is first analyzed, and then the zero-phase equivalent circuit is transformed into an equivalent circuit in terms of the zero-phase difference currents (referred to as a difference current equivalent circuit hereinafter). This method is described below.

FIG. 10A shows a three-terminal parallel two-circuit transmission line where $l_a$ is a distance from the sending end to a branch point, and $l_b$ and $l_c$ are distances from the branch point to two receiving ends. The distances $l_a$, $l_b$, and $l_c$ are the lengths of the transmission lines and are known. FIG. 10B shows a zero-phase equivalent circuit of the aforementioned three-terminal parallel two-circuit transmission line and FIG. 10C shows a difference-current equivalent circuit derived on the basis of the zero-phase current difference of the respective circuits.

In FIG. 10C, $\Delta I_{0a}$ is the difference current flowing into the branch point from the sending end A, $\Delta I_{0b}$ and $\Delta I_{0c}$ are the difference circuits flowing into the branch point from receiving ends B and C, respectively, and $\Delta I_{0f}$ is the difference current flowing out of the single phase ground fault. When a single phase ground fault occurs between the sending end A and the branch point, the shunt current ratio of zero-phase difference current is given by $$\frac{(\Delta \dot{I}_{0b} + \Delta \dot{I}_{0c})}{(\Delta \dot{I}_{0a} + \Delta \dot{I}_{0b} + \Delta \dot{I}_{0c})}.$$

Using the above equation, the following relationship is obtained:

$$x = L/(l_b + l_c) \frac{(\Delta \dot{I}_{0b} + \Delta \dot{I}_{0c})}{(\Delta \dot{I}_{0a} + \Delta \dot{I}_{0b} + \Delta \dot{I}_{0c})},$$

where $L = l_a l_b + l_b l_c + l_a l_c$.

When x is greater than $l_a$, that is, when the single ground fault occurred at a point on the line farther from the sending point A than the branch point is from sending point A, the shunt current ratio of the zero-phase difference currents is given by $$\frac{(\Delta \dot{I}_{0a} + \Delta \dot{I}_{0b})}{(\Delta \dot{I}_{0a} + \Delta \dot{I}_{0b} + \Delta \dot{I}_{0c})}.$$

Using this relation, the distance x from the receiving end C to the fault is calculated by $$x = L/(l_a + l_b) \frac{(\Delta \dot{I}_{0a} + \Delta \dot{I}_{0b})}{(\Delta \dot{I}_{0a} + \Delta \dot{I}_{0b} + \Delta \dot{I}_{0c})}.$$

If x is smaller than $l_c$, then x is the distance from the receiving end C to the ground fault (refer to FIG. 10D).

When x is greater than $l_c$, then the shunt current ratio of zero sequence differential current is given by $$\frac{(\Delta \dot{I}_{0c} + \Delta \dot{I}_{0a})}{(\Delta \dot{I}_{0a} + \Delta \dot{I}_{0b} + \Delta \dot{I}_{0c})}.$$

By the use of this relation, the distance x from the receiving and B to the fault is calculated by $$x = L/(l_c + l_a) \frac{(\Delta \dot{I}_{0c} + \Delta \dot{I}_{0a})}{(\Delta \dot{I}_{0a} + \Delta \dot{I}_{0b} + \Delta \dot{I}_{0c})}.$$

If x is smaller than $l_b$, then x is the distance from the receiving end B to the ground fault (refer to FIG. 10E).

Thus, the zero-phase currents of the respective circuits at the sending end A and the receiving ends B and C are detected and the shunt current ratios of the zero sequence differential current are then multiplied by correction factors given by $L(l_b + l_c)$, $L/(l_c + l_a)$, and $L/(l_a + l_b)$ respectively, thus providing the distance x from each end to the single phase fault.

Another conventional method of short-circuit localization is on the principle of a 44S relay calculation operation where the impedance from a sending end to a fault point is determined by dividing a line delta voltage, line delta current when a fault occurs. FIG. 11 is a simplified circuit diagram of a three-terminal parallel two-circuit transmission line, illustrating the above-described 44S method. In this figure, circuits f1 and f2 are connected between a sending end A and a receiving end B having a two-circuit branch point T from which the circuit f1 and f2 branch off to a receiving end D. A load LB is connected with the receiving end B and a load LC with the receiving end C. In the circuit, x is a distance from the sending end A to a fault point in FIG. 11A or a distance from the branch point T to a fault point in FIGS. 11B and 11C; $l_a$ is a distance from the sending end A to the two-circuit branch point T; $l_b$ is a distance between the two-circuit branch point T and the receiving end B; $l_c$ is a distance between the two-circuit branch point T and the receiving end C; Z is a positive sequence impedance per unit length of the transmission line; Va and Vb are voltages of phases A and B, respectively, at the sending end A; Vaf and Vbf are voltages of phases A and B, respectively, at a fault point; $I_{a1}$ and $I_{b1}$ are currents of phases A and B of the circuit f1 at the sending end A; $I_{a1}'$ and $I_{b1}'$ are currents of phases A and B of the circuit f1 at the receiving end B; $I_{a1}''$ and $I_{b1}''$ are currents of phases A and B of the circuit f1 at the receiving end C; $I_{LBa}$ and $I_{LBb}$ are currents of phases A and B flowing into the load LB when a fault occurs; and $I_{LCa}$ and $I_{LCb}$ are currents of phases A and B flowing into the load LC when a fault occurs.

With the aforementioned condition, by the use of the 44S method algorithm, a distance x is determined for (1) a short-circuit in which the phase A is short-circuited to the phase B of the circuit f1 between the sending end A and the two-circuit branch point T (FIG. 11A), (2) a short-circuit in which the phase A is short-circuited to the phase of the B of the circuit f1 between the receiving end B and the two-circuit branch point T (FIG. 11B), and (3) a short-circuit in which the phase A is short-circuited to the phase B of the circuit f1 between the receiving end C and the two-circuit branch point T (FIG. 11C).

For the case (1), the following equation is derived using Kirchhoff's voltage low:

$$V_{af} - V_{bf} = V_a - V_b - xZ(I_{a1} - I_{b1}).$$

Rewriting the above equation, we have:

$$(V_a - V_b)/(I_{a1} - I_{b1}) = xZ + (V_{af} - V_{bf})/(I_{a1} - I_{b1})$$

For the case (2), the following equation is derived by again using Kirchhoff's voltage low:

$$V_{af} - V_{bf} = V_a - V_b - (l_a + x)Z(I_{a1} - I_{b1}) - xZ(I_{a1}'' - I_{b1}'')$$

Rewriting the above equation, we have $$(\dot{V}_a - \dot{V}_b)/(\dot{I}_{a1} - \dot{I}_{b1}) =$$
$$(l_a + x)\dot{Z} + x\dot{Z}(\dot{I}_{a1''} - \dot{I}_{b1''})/(\dot{I}_{a1} - \dot{I}_{b1}) +$$
$$(\dot{V}_{af} - \dot{V}_{bf})/(\dot{I}_{a1} - \dot{I}_{b1}).$$

Likewise, for the case (3), the following equation is obtained.

$$(\dot{V}_f - \dot{V}_b)/(\dot{I}_{a1} - \dot{I}_{b1}) =$$
$$(l_a + x)\dot{Z} + x\dot{Z}(\dot{I}_{a1'} - \dot{I}_{b1'})/(\dot{I}_{a1} - \dot{I}_{b1}) +$$
$$(\dot{V}_{af} - \dot{V}_{bf})/(\dot{I}_{a1} - \dot{I}_{b1})$$

As is apparent from above, the three equations include the positive sequence impedance to the fault point for the first term on the right hand side, as well as an error (Vaf–Vbf)/($I_{a1} - I_{b1}$) of the fault point due to a fault resistance, and errors $xZ(I_{a1}'' - I_{b1}'')/(I_{a1} - I_{b1})$ or $xZ(I_{a1}' - I_{b1}')/(I_{a1} - I_{b1})$ due to shunt current through a parallel line and a sound branch.

The value of (Vaf–Vbf) is small when a short-circuit fault occurs, and ($I_{a1} - I_{b1}$) includes the short-circuit current and the load current. The load current may be neglected. Thus, (Vaf– Vbf)/($I_{a1} - I_{b1}$) is considered to be a resistance at a fault. Accordingly, by adopting the reactance component, the effects thereof can be nearly eliminated. The distance x to a fault point in the above case (1) can be calculated through the following equation.

$$I_m[(V_a - V_b)/(I_{a1} - I_{b1})] = x \, I_m[Z]$$

where $I_m [\ldots]$ is the reactance component.

However, a branch error is caused by the fact that the fault current is distributed to the two-circuit branches as in the cases (2) and (3). A fault location method free from the effects of the branch error has been proposed (Japanese Patent Application No. Sho. 63-307612).

The aforementioned methods of fault-localization for three-terminal parallel two-circuit transmission lines are capable of localizing a ground fault on three-terminal parallel two circuit transmission lines, but cannot be applied to parallel two-circuit transmission lines having more than three terminals. In recent years, the parallel two-circuit transmission lines have often been of multiterminal systems, and there has been a need for a ground fault localization method that can generally be applied to n-terminal parallel two-circuit transmission lines.

Today, sophisticated methods have been employed for protecting the parallel two-circuit transmission lines. An example of such a method is the differential current protection method where current information at the respective terminals are transmitted to the main station by means of radio transmission or optical transmission, so that the fault localization may be performed on the basis of the current information at all the terminals.

SUMMARY OF INVENTION

The invention is based in part on the recognition that this method allows the basic current data of the respective terminals to be available at the main station at all times, so that the analysis of the information from the occurrence of the fault until shutting off the line provides basic data necessary for locating a ground fault by the method of this invention. The present invention has been made in view of the above circumstances and has as an object to further develop the method in the previously mentioned patent applications and to provide a fault localization for an n-terminal parallel two-circuit transmission line, which is based on the current information on the respective terminals and is generally applicable to n-terminal parallel two-circuit transmission lines.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the above objects and in accordance with the purpose of the invention, as embodied and broadly described herein, the method of locating a fault point in a parallel two-circuit transmission line in an n-terminal system having a plurality of branches, connected to the transmission line at branch nodes, when a single fault occurs at one place in one circuit of the transmission line and when a multiple fault occurs at the same place in the two circuits, by calculating a distance to the fault point, of the present invention comprises the steps of:

(a) performing equivalent transformation with respect to a branch point $b_k$ of the parallel two-circuit transmission line, to transform the transform line into a T three-terminal parallel two-circuit transmission line circuit having three terminal k−1, k, and k+1, the equivalent circuit including at least one branch $B_k$ having a length on the equivalent circuit being indicative of the distance from the branch point $b_k$ to a first terminal connected to that branch point;

(b) calculating a value $x_k$ representing a length on the equivalent circuit from the terminal connected to the branch point $b_k$ to the fault point on the equivalent circuit, on the basis of differential currents flowing into the branch points;

(c) if $x_k$ is less than the length on the equivalent circuit of the branch $B_k$, locating the fault point by employing the value $x_k$ as the distance on the parallel two-circuit transmission line from the first terminal k to the fault point;

(d) if $x_k$ is not less than the length on the equivalent circuit of the branch $B_k$, calculating a value $x_{k-1}$ representing a length on the equivalent circuit from a terminal connected to branch $b_{k-1}$ to the fault point on the basis of the differential currents;

(e) if $x_{k-1}$ is less than the length on the equivalent circuit of branch $B_{k-1}$, and if the branch point $b_k$ is connected to a second terminal with no branch points therebetween, locating the fault point by employing $x_{k-1}$ as the distance from the second terminal to the fault point;

(f) if $x_{k-1}$ is less than the length on the equivalent circuit of branch $B_{k-1}$ and if the branch point $b_k$ is not connected to a second terminal with no branch points therebetween performing equivalent transformation of the parallel two-circuit transmission line with respect to the branch point $b_{k-1}$, to transform the transmission line into a T three-terminal parallel two-circuit transmission line circuit having three terminals k−2, k−1, and k, the equivalent circuit including at least one branch $b_{k-1}$ having a length on the equivalent circuit being indicative of the distance from the branch point $b_{k-1}$ to a first terminal connected with that branch point; and (g) if $x_{k-1}$ is not less than the length on the equivalent circuit of branch $B_{k-1}$, and if the branch point $b_k$ is connected to a second terminal with no branch points therebetween, calculating a value $x_{k+1}$ representing a length on the equivalent circuit from a terminal connected to branch $B_{k+1}$ to the fault point on the basis of the differential currents and locating the fault point by employing $x_{k+1}$ as the distance form the second terminal to the fault point;

(i) if $x_{k-1}$ is not less than the length on the equivalent circuit of branch $B_{k-1}$ and if the branch point $b_k$ is not connected to a second terminal with no branch points therebetween, performing equivalent transformation of the parallel two-circuit transmission line with respect to the branch point $b_{k+1}$ to transform the transmission line into a T three-terminal parallel two-circuit transmission line circuit having three terminals k, k+1 and k+2, the equivalent circuit including at least one branch $B_{k+1}$ having a length on the equivalent circuit being indicative of the distance from the branch point $b_{k+1}$ to a first terminal connected with that branch point; and (j) repeating the steps (b)–(g), (i) for the equivalent circuit.

BRIEF DESCRIPTION OF THE DRAWINGS

FIGS. 4(a) and 4(b) are diagrams showing examples of fault points in difference current equivalent circuits;

FIGS. 5(a), 5(b), 5(c), 5(d), 5(e), 5(a'), 5(b'), and 5(c') shows the transformation from an inverted L-type difference current equivalent circuit into a T equivalent circuit;

DETAILED DESCRIPTION OF THE PREFERRED EMBODIMENTS

Figure 2:
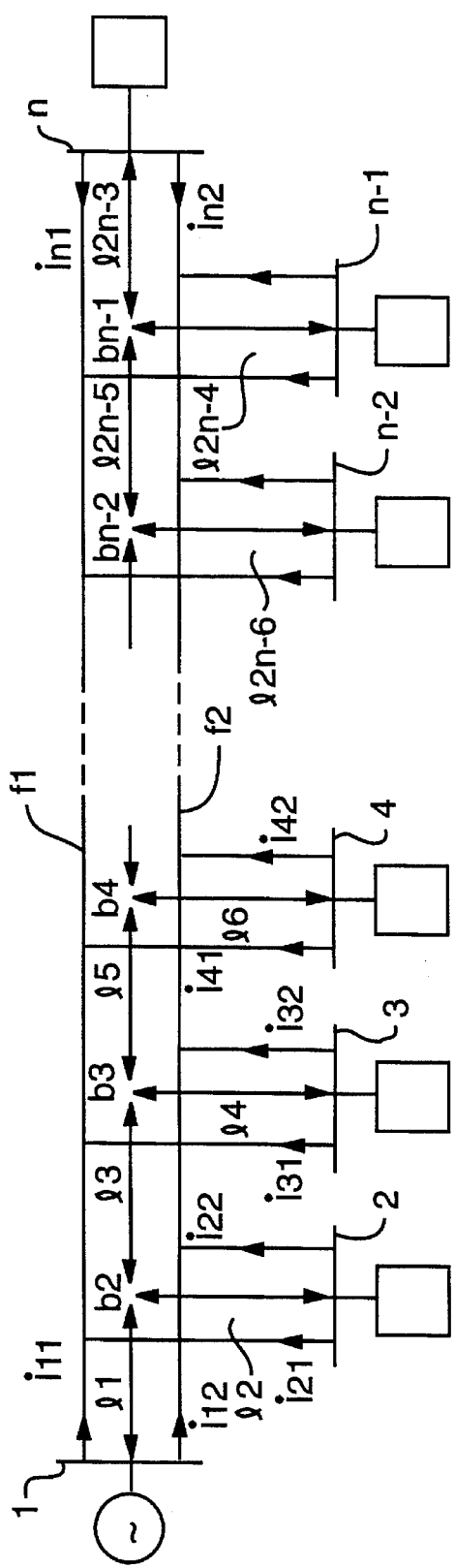
FIG. 2 is a circuit diagram showing a general n-terminal parallel two-circuit transmission line.

FIG. 2 shows an n-terminal parallel two-circuit transmission line to which the present invention is applied. Referring to FIG. 2, between the sending end or receiving end 1 (referred to as a terminals hereinafter) and a terminal n, there are a total of n-2 branch points including $b_2$, $b_3$, ..., $b_{n-3}$, $b_{n-2}$, $b_{n-1}$. The branches are connected to terminals 2, 3, ..., n-1, respectively, via the two circuits f1 and f2 of the transmission line. In FIG. 2, $l_1$ is the distance between the terminal 2 and the branch point $b_2$, $l_2$ the distance between the terminal 2 and the branch point $b_2$, $l_3$ the distance between the branch points $b_2$ and $b_3$, ... $l_{2k-2}$ the distance between the terminal k and the branch point $b_k$, and $l_{2k-1}$ the distance between the branch points $b_k$ and $b_{k+1}$. Additionally $I_{11}$ is the positive sequence current flowing out of the terminal 1 in the circuit f1, $I_{12}$ is the positive sequence current flowing out of the terminal 1 in the circuit f2, $I_{k1}$ is the positive sequence current flowing out of the terminal k in the circuit $f_1$, $I_{k2}$ is the positive sequence current flowing out of the terminal k in the circuit $f_2$. Instead of the positive sequence current, even if a reverse sequence current or a zero sequence current relating to a fault, or a sequence current (fault sequence current) relating to the fault among A, B or C sequence current is selected, the same results are obtained. However, in order to avoid duplication of description, the following description relates to only the positive sequence current.

Figure 3:
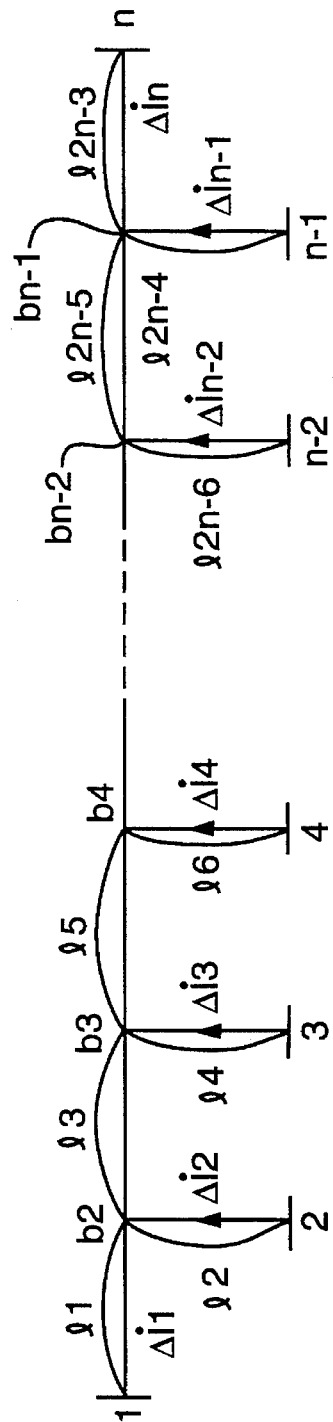
FIG. 3 is an equivalent circuit of FIG. 2 expressed in terms of difference currents.

FIG. 3 is a differential current equivalent circuit in terms of the positive sequence differential currents of the circuits in FIG. 2, in which the positive sequence differential currents $\Delta I_1$, $\Delta I_2$, ..., $\Delta I_n$ are flowing out of the terminals 1, 2, ..., n, respectively. More, the difference currents are defined by $\Delta I_k = I_{k1} - I_{k2}$.

Faults may be classified by two cases as shown in FIGS. 4(a) and 4(b). That is, when a ground fault is between the branch point $b_k$ and the terminal k, x is the distance between the terminal k and the fault point. When a fault occurs is between the branch points $b_k$ and $b_{k+1}$, y is the distance from the branch $b_k$ to the fault point. The fault current flowing out of the circuit f1 at the fault point is defined to be $I_{f1}$, and that of the circuit f2 to be $I_{f2}$, and the difference between the fault currents is defined by $\Delta I_f = I_{f1} - I_{f2}$. Either $I_{f1}$ or $I_{f2}$ may be zero.

Figure 10A:
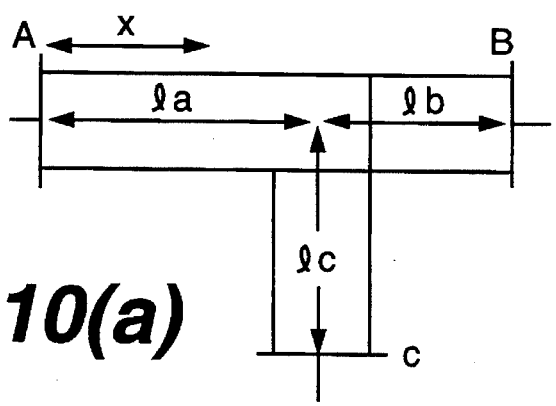
Figure 10B:
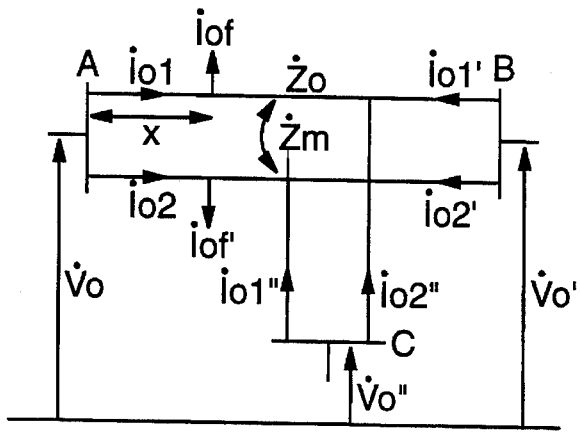
Figure 10C:
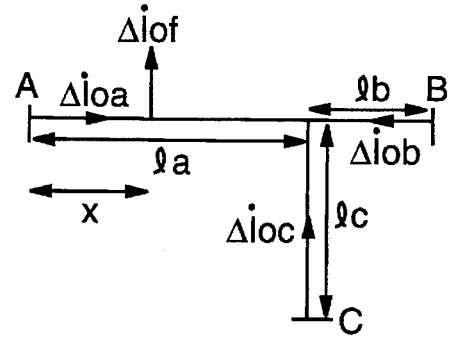
Figure 10D:
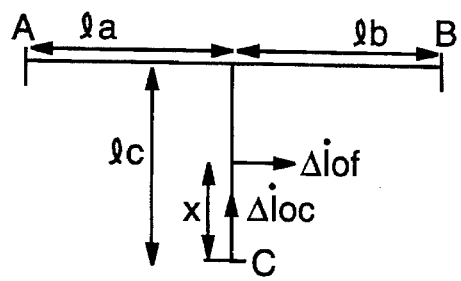
Figure 10E:
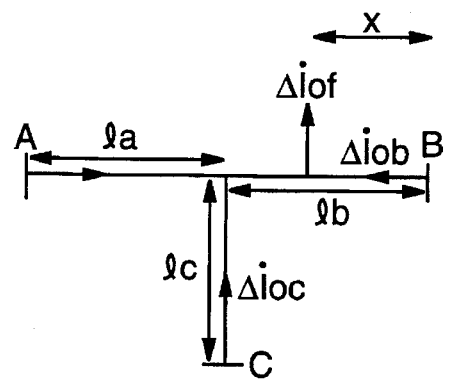
Figure 11A:
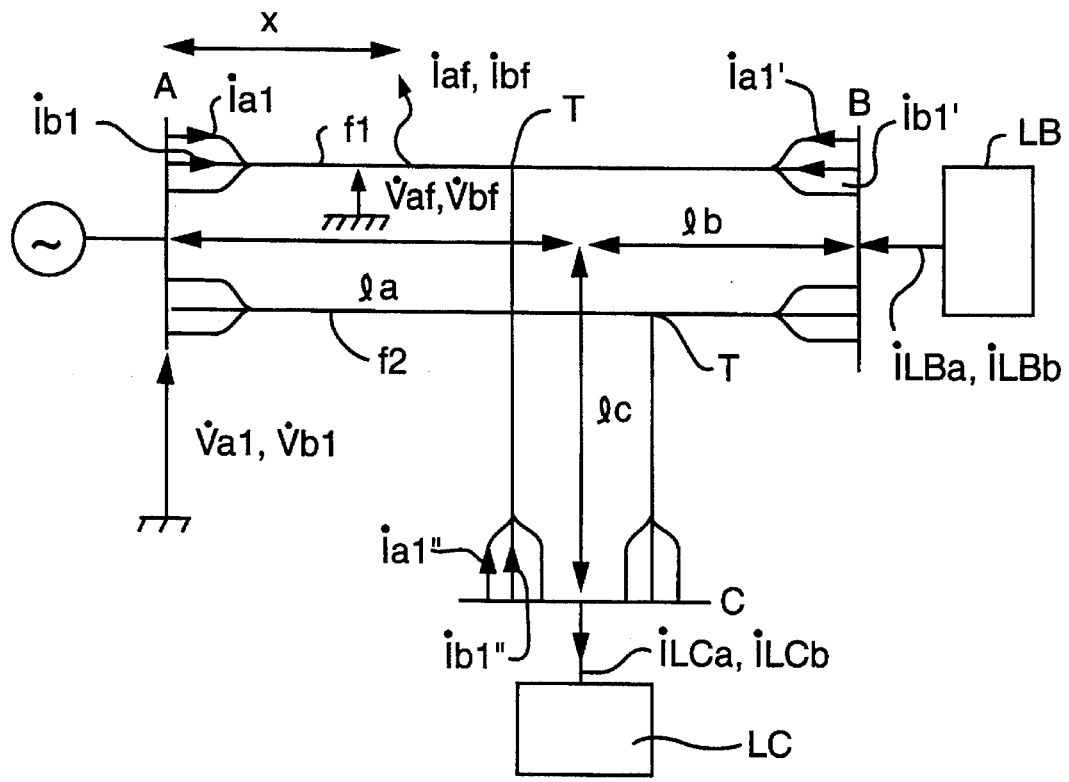
Figure 11B:
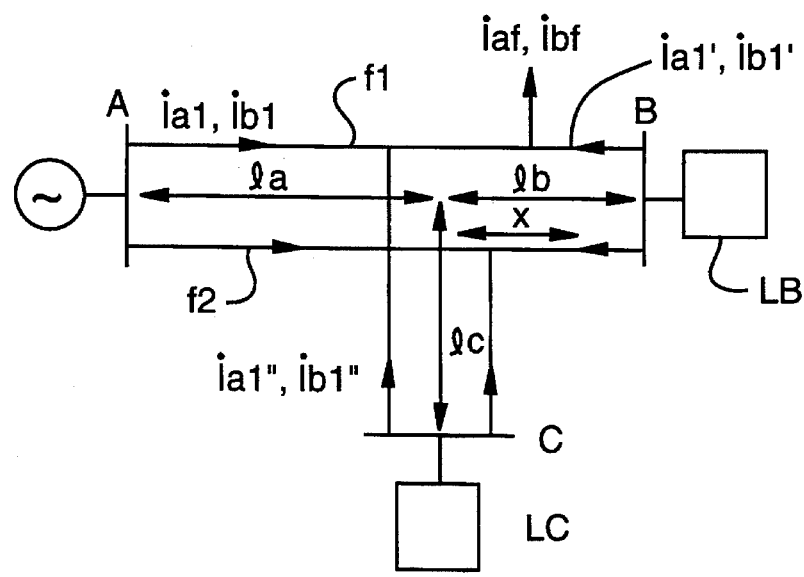
Figure 11C:
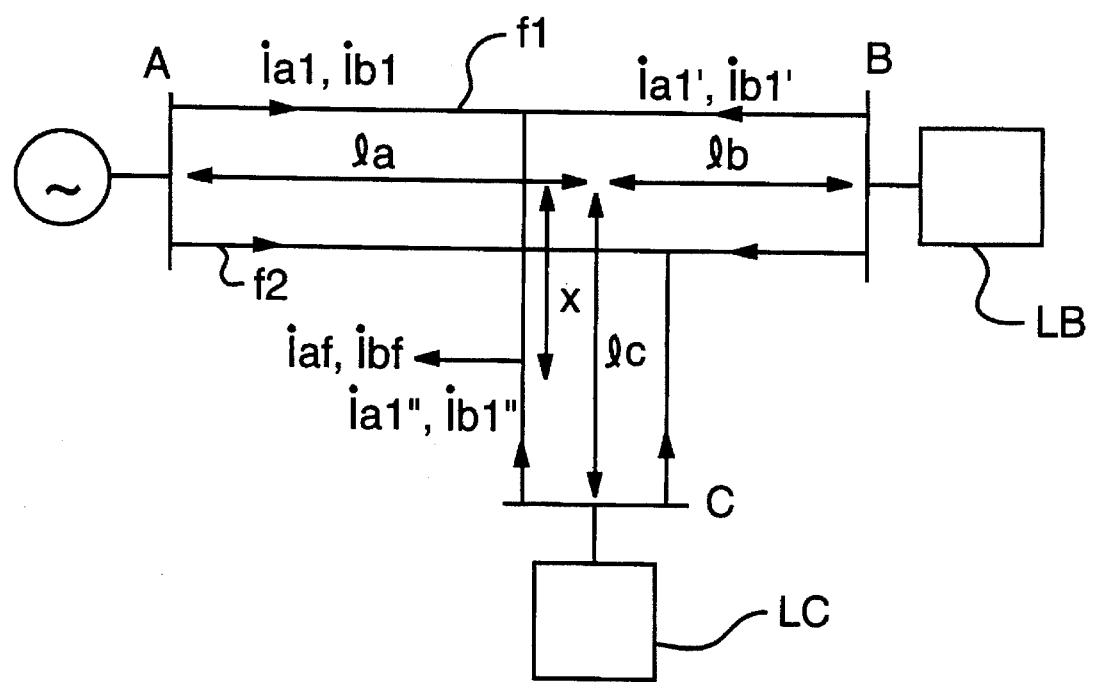

In order to use the equivalent circuits in FIGS. 10(C) to 10(E) to locate the fault point, the equivalent circuit in FIG. 3 must first be transformed as follows:

FIGS. 5(a) and 5(a') show the principle of equivalent-transformation, where a circuit (FIG. 5(a)) having the terminals 1 and 2 and the branch point $b_2$ is transformed into a single circuit (FIG. 5(a')) having an imaginary terminal 2' without a branch. It should be noted that the difference current $\Delta I (= \Delta I_1 + \Delta I_2)$ flowing out of the branch point $b_2$ and the difference voltage $\Delta V$ of the branch point $b_2$ and the difference voltage $\Delta V$ of the circuit in FIG. 5(a) before transformation are equal to the difference current $\Delta I$ flowing out of the end $b_2$ and the differential voltage $\Delta V$ of the end $b_2$ in FIG. 5(a') after transformation. As a result of this transformation, the imaginary difference current $\Delta I_2$, flowing out of the imaginary terminal 2' is given by $$\Delta I_{2'} = \Delta I_1 + \Delta I_2$$
$$= \Delta I$$

and the distance from the imaginary terminal 2' to the right end $b_2$ of the circuit is given by $$l_2 = l_1 l_2 / (l_1 + l_2)$$

If a fault exists between the terminal 1 and the branch point $b_2$ in the circuit shown in FIG. 5(b), the distance x' of the imaginary fault point after equivalent-transformation is given by (referring to FIG. 5(b')):

$$x' = x(l_2'/l_1),$$

providing that the difference voltage $\Delta V$ and the difference current $\Delta I (= \Delta I_1 + \Delta I_2 - \Delta I_f)$ flowing out of the branch point $b_2$ of the circuit in FIG. 5(b) before transformation are equal to the difference voltage $\Delta V$ and the difference current $\Delta I$ flowing out of the branch point $b_2$ on the right end of the circuit in FIG. 5(b') after transformation, respectively. Here, x is the actual distance from the terminal 1 to the fault point. In addition, the imaginary difference current $\Delta I_2'$ and the imaginary distance $l_2'$ are of the same values as in FIG. 5(a').

Figure 5C:
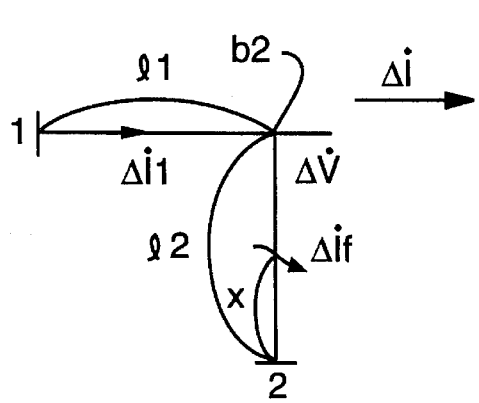

If the circuit before transformation, having the terminals 1 and 2 and the branch point $b_2$, has a fault point between the terminal 2 and the branch point $b_2$ as shown in FIG. 5(c), the distance x' of the imaginary fault point after equivalent-transformation is given by (referring to FIG. 5(c'))

$$x' = x(l_2'/l_2),$$

providing that the difference voltage $\Delta V$ and the difference current $\Delta I (= \Delta I_1 + \Delta I_2 - \Delta I_f)$ flowing out of the branch point $b_2$ of the circuit in FIG. 5(c) before transformation are equal to the difference voltage $\Delta V$ and the difference current $\Delta V$ flowing out of the branch on the right end of the circuit in FIG. 5(c') after transformation. In addition, the imaginary difference current $\Delta I_2'$ and the distance $l_2'$ are of the same value as in FIG. 5(a').

In this manner, the inverted L type differential current circuit in FIG. 5(a) can be transformed into a simple linear differential current circuit shown in FIG. 5(a') and the fault points in FIGS. 5(b) and 5(c) can be transformed into the imaginary fault points in FIG. 5(b') and 5(c'), respectively.

Figure 5D:
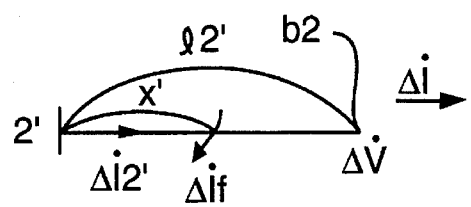
Figure 5D:
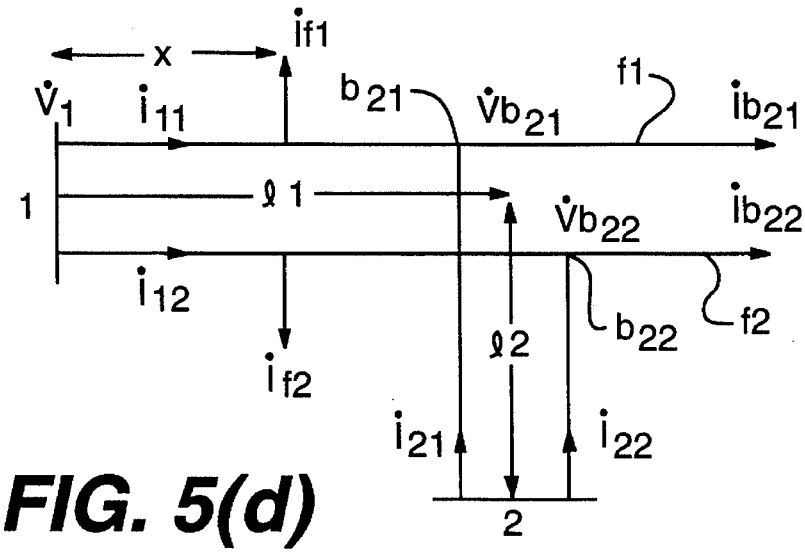
Figure 5E:
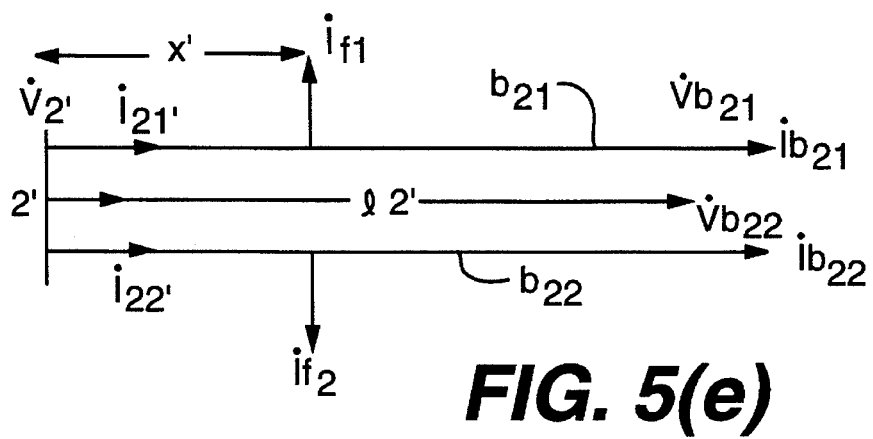

The above method can be justified as follows: FIGS. 5(d) and 5(e) are equivalent in that the voltages $V_{b21}$ and $V_{b22}$ at the branch points $b_{21}$ and $b_{22}$ are equal and the currents $I_{b21}$ and $I_{b22}$ flowing out of the branch points $b_{21}$ and $b_{22}$ are equal.

Assuming that the self impedance per unit length of the line is Z and the mutual impedance between the two circuits is $Z_m$, the following relation exists with respect to FIG. 5(d). In the following $Z_m = 0$ for the positive sequence circuit and the negative sequence circuit.

With respect to the circuit f1, $$\dot{V}_{b21} = \dot{V}_1 - x\dot{Z}\dot{I}_{11} - x\dot{Z}_m\dot{I}_{12} - (l_1 - x)\dot{Z}(\dot{I}_{11} - \dot{I}_{f1}) - (l_1 - x)\dot{Z}_m(\dot{I}_{11} - \dot{I}_{f2}).$$

Rewriting the right hand side, we obtain $$\dot{V}_{b21} = \dot{V}_1 - l_1(\dot{Z}\dot{I}_{11} + \dot{Z}_m\dot{I}_{12}) + (l_1 - x)(\dot{Z}\dot{I}_{f1} + \dot{Z}_m\dot{I}_{f2})$$

and $$\dot{V}_{b21} = \dot{V}_2 - l_2(\dot{Z}\dot{I}_{21} + \dot{Z}_m\dot{I}_{22})$$

From these two equations, we have $$\dot{V}_{b21}/l_1 + \dot{V}_{b21}/l_2 = \dot{V}_1/l_1 + \dot{V}_2/l_2 - \{\dot{Z}(\dot{I}_{11} + \dot{I}_{21}) + \dot{Z}_m(\dot{I}_{12} + \dot{I}_{22})\} + (1 - x/l_1)(\dot{Z}\dot{I}_{f1} + \dot{Z}_m\dot{I}_{f2})$$

Further rewriting the above equation, we obtain $$\dot{V}_{b21} = (l_2\dot{V}_1 + l_1\dot{V}_2)/(l_1 + l_2) - \{l_1l_2/(l_1 + l_2)\}\{\dot{Z}(\dot{I}_{11} + \dot{I}_{21}) + \dot{Z}_m(\dot{I}_{12} + \dot{I}_{22})\} + \{(l_1l_2 - xl_2)/(l_1 + l_2)\}(\dot{Z}\dot{I}_{f1} + \dot{Z}_m\dot{I}_{f2})$$

as for the current, we have the following relationship.

$$\dot{I}_{b21} = \dot{I}_{11} + \dot{I}_{21} - \dot{I}_{f1}$$

Likewise, we have the following relationship with respect to the circuit $f_2$, $$\dot{V}_{b22} = (l_2\dot{V}_1 + l_1\dot{V}_2)/(l_1 + l_2) - \{l_1l_2/(l_1 + l_2)\}\{\dot{Z}(\dot{I}_{12} + \dot{I}_{22}) + \dot{Z}_m(\dot{I}_{11} + \dot{I}_{21})\} + \{(l_1l_2 - xl_2)/(l_1 + l_2)\}(\dot{Z}\dot{I}_{f2} + \dot{Z}_m\dot{I}_{f1})$$

and for the current, we have the following relationship.

$$\dot{I}_{b22} = \dot{I}_{12} + \dot{I}_{22} - \dot{I}_{f2}$$

By defining $V_2'$, $I_{21}'$, $I_{22}'$, $l_2'$, and $x'$ as:

the above equations can be rewritten as follows:

$$\dot{V}_{b21} = \dot{V}_{2'} - l_{2'}(\dot{Z}\dot{I}_{21'} + \dot{Z}_m\dot{I}_{22'}) + (l_{2'} - x')(\dot{Z}\dot{I}_{f1} + \dot{Z}_m\dot{I}_{f2})$$
$$\dot{I}_{b21} = \dot{I}_{21'} - \dot{I}_{f1}$$
$$\dot{V}_{b22} = \dot{V}_{2'} - l_{2'}\{\dot{Z}\dot{I}_{22'} + \dot{Z}_m\dot{I}_{21'}\} + (l_{2'} - x')(\dot{Z}\dot{I}_{f2} + \dot{Z}_m\dot{I}_{f1})$$
$$\dot{I}_{b22} = \dot{I}_{22'} - \dot{I}_{f2}$$

These four equations are valid for the circuit in FIG. 5(e). By defining $\Delta V$ and $\Delta I$ in the above four equations in terms of the differential currents.

$$\Delta I_1 = I_{11} - I_{12}$$

$$\Delta I_2 = I_{21} - I_{22}$$

$$\Delta I_f = I_{f1} - I_{f2}$$

$$\Delta I_2' = I_{21}' - I_{22}'$$

$$\Delta I = I_{b21} - I_{b22}$$

$$\Delta V = V_{b21} - V_{b22},$$

we obtain the following relationship:

$$\Delta V = -l_2'(Z - Z_m)\Delta I_2' + (l_2' - x')(Z - Z_m)\Delta I_f$$

$$\Delta I = \Delta I_2' - \Delta I_f.$$

It is obvious that these two equations are valid for the differential voltage $\Delta V$ at the branch point $b_2$ and the differential current $\Delta I$ at $b_2$ in the circuit of FIG. 5(b').

FIGS. 5(a) and 5(b') show the cases where $I_{f1} = I_{f2} = 0$ in FIGS. 5(b) and 5(b'), and FIGS. 5(c) and 5(c') show the cases where the terminals 1 and 2, the distances $l_1$ and $l_2$, and the differential currents $\Delta I_1$ and $\Delta I_2$ are interchanged, respectively, in FIGS. 5(b) and (b').

The procedure of fault location will now be described.

Figure 1A:
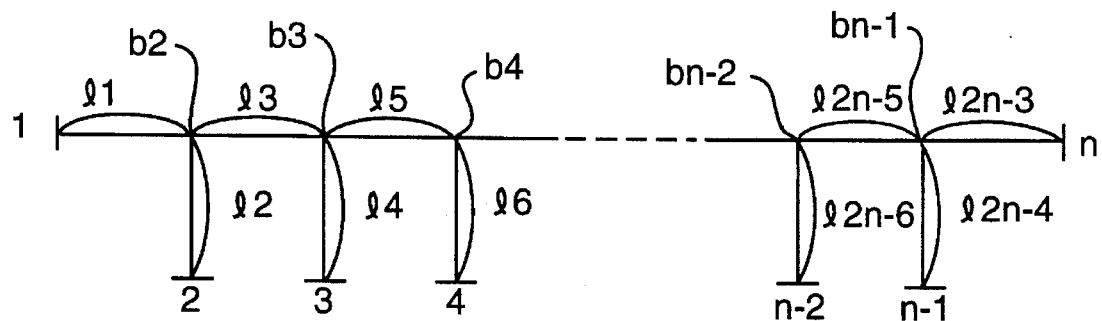
FIG. 1(a), 1(b), 1(c), and 1(d) are conceptual diagrams showing a fault localization for a general n-terminal parallel two-circuit transmission line.

First, fault location is performed with respect to an inverted L-type differential current circuit having the terminals 1 and 2 and the branch point $b_2$ shown in FIG. 1(a). FIG. 1(a) is a duplicate of FIG. 3.

Figure 1B:
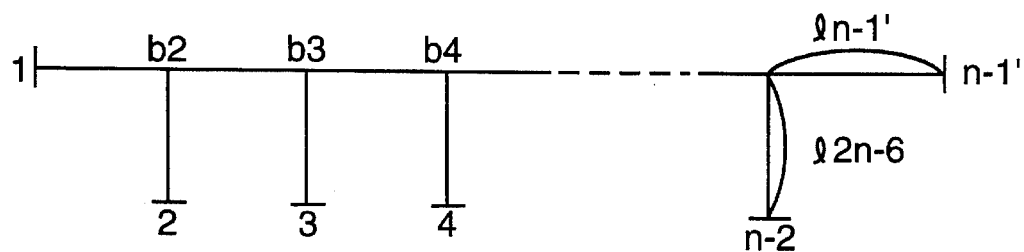
Figure 1C:
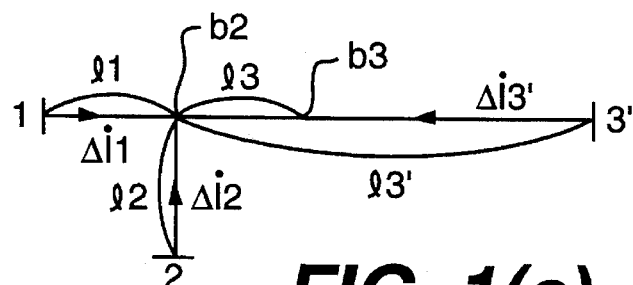

The differential current equivalent circuit including this inverted L-type differential current circuit can be converted into a T-type three terminal parallel two-circuit transmission circuit as shown in FIG. 1(c). In FIG. 1(c), the imaginary terminal 3' represents the terminal which is generated by the equivalent transformation to the actual terminals 3, 4, ..., n and the imaginary current $\Delta I_3$, flowing out of the terminal 3' is a known value and is given by $$\Delta I_3' = \Delta I_3 + \Delta I_4 + \ldots + \Delta I_n.$$

The imaginary distance from the branch point $b_2$ to the imaginary terminal 3' is represented by $l_3'$.

The imaginary distance $l_3'$ is determined by first transforming through the previously mentioned transformation technique the inverted L type differential current circuit having the terminals n and n–1 and the branch point $b_{n-1}$ into the linear equivalent circuit (imaginary distance is $l_{n-1}'$) having the imaginary terminal n–1' as shown in FIG. 1(b), and then transforming the inverted L-type differential current circuit having the imaginary terminal n–1', terminal n–2, and the branch point $b_{n-2}$ in FIG. 1(b) into an equivalent circuit (imaginary distance is $l_{n-2}'$) having an imaginary terminal n–2', and thereafter the similar procedure is carried out one after another. That is, in the respective linear equivalent circuits $l_{n-1}', l_{n-2}', \ldots, l_3'$ are given by $$l_{n-1}' = \frac{l_{2n-3}l_{2n-4}}{(l_{2n-3} + l_{2n-4})} + l_{2n-5}$$

$$l_{n-2}' = \frac{l_{n-1}' l_{2n-6}}{(l_{n-1}' + l_{2n-6})} + l_{2n-7}$$

...

$$l_3' = \frac{l_{4'} l_4}{(l_{4'} + l_4)} + l_3$$

The fault location will now be performed with respect to the circuit in FIG. 1(c). The procedure is the same as that disclosed in Japanese Patent Application No. 63-307612, which as previously been described with reference to FIG.

10. The procedure is again described here. The distance x from the imaginary terminal 3' to the fault point is given in terms of $\Delta I_1$, $\Delta I_2$, and $\Delta I_3'$ by $$x = \{L/(l_1 + l_2)\} \frac{(\Delta \dot{i}_1 + \Delta \dot{i}_2)}{(\Delta \dot{i}_1 + \Delta \dot{i}_2 + \Delta \dot{i}_{3'})}$$

where $L = l_1 l_2 + l_2 l_3' + l_3' l_1$.

If $x \leq l_3'$, then the fault exists between the branch point $b_2$ and the imaginary terminal 3'. If $x > l_3'$ then the fault exists between the terminal 1 and the branch point $b_2$ or between the terminal 2 and the branch point $b_2$. The actual distance x is determined by $$x = \{L/(l_2 + l_{3'})\} \frac{(\Delta \dot{i}_2 + \Delta \dot{i}_{3'})}{(\Delta \dot{i}_1 + \Delta \dot{i}_2 + \Delta \dot{i}_{3'})}$$

or $$x = \{L/(l_{3'} + l_1)\} \frac{(\Delta \dot{i}_{3'} + \Delta \dot{i}_1)}{(\Delta \dot{i}_1 + \Delta \dot{i}_2 + \Delta \dot{i}_{3'})}$$

Figure 1D:
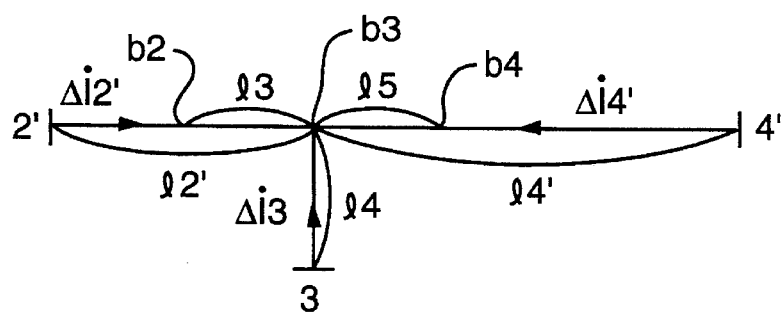

If the fault exists between the branch point $b_2$ and the imaginary terminal 3', then the method in the previously filed Japanese Patent Application cannot be used, in which case the actual fault is considered to be at any one of terminals 3, 4, ..., n on the right side of the branch point $b_2$ in FIG. 1(a). Thus, the circuit having the terminals 1 and 2 and the branch point $b_2$ is transformed into an equivalent circuit through the previously described transformation procedure, and then the circuit on the right side of the branch point $b_4$ is transformed into a linear equivalent circuit having an imaginary terminal 4' through the same transformation procedure. This transformation operation produces a T equivalent circuit having the terminal 3 at an intermediate position as shown in FIG. 1(d).

The imaginary differential current $\Delta I_2'$ is given by $$\Delta I_2' = \Delta I_1 + \Delta I_2$$

and the imaginary differential current $\Delta I_4'$ is a known value given by $$\Delta I_4' = \Delta I_4 + \ldots + \Delta I_n$$

The imaginary distance $l_2'$ is determined by $$l_{2'} = \frac{l_1 l_2}{(l_1 + l_2)} + l_3$$

and the imaginary distance $l_4'$ can be determined by the previously mentioned procedure in which the circuit in FIG. 1(a) is transformed step by step from the right end. The aforementioned procedure of the previously filed Japanese Patent Application can be applied to the thus transformed circuit. If x calculated by an equation $$x = \{L/(l_{2'} + l_4)\} \frac{(\Delta \dot{i}_2 + \Delta \dot{i}_{4'})}{(\Delta \dot{i}_{2'} + \Delta \dot{i}_3 + \Delta \dot{i}_{4'})}$$

$$(L = l_2 l_4 + l_4 l_{4'} + l_{4'} l_{2'})$$

is smaller than $l_4$, that is, the fault exists between the terminal 3 and the branch point $b_3$, then the value of x is the distance from the terminal 3 to the fault point. If x obtained by the above equation is not smaller than $l_4$ and the value of x obtained by the following equation, $$x = \{L/(l_4 + l_{4'})\} \frac{(\Delta \dot{i}_3 + \Delta \dot{i}_{4'})}{(\Delta \dot{i}_{2'} + \Delta \dot{i}_3 + \Delta \dot{i}_{4'})}$$

is smaller than $l_2'$, that is, the fault exists between the imaginary terminal 2' and the branch point $b_3$, then the fault is between the branch point $b_2$ and the branch point $b_3$. This is because the fault point has been known to exist at the terminals 3, 4, ..., n on the right side of the branch point $b_2$ through the use of the procedure described with reference to FIG. 1(c). The distance x to the fault point is the distance from the imaginary terminal 2' and the distance y from the branch point $b_2$ is give by $$y = x - (l_2' - l_3)$$

If x does not fall in any case mentioned above, then the fault is supposed to exist at one of the terminals 4, 5, ..., n on the right side of the branch point $b_3$. Thus, the circuits on the left and right sides of $b_4$ are transformed into a T equivalent circuit through equivalent transformation so as to iterate the above-described fault localization procedure.

In this manner, if the fault point is between the terminals 2, 3, ..., n−1 and the branch points $b_2$, $b_3$, ..., $b_{n-1}'$ then the distance x from one of these terminals can be determined. If the fault point exists between the branch points $b_k$ and $b_{k+1}'$, then the distance to the fault point in that second can be determined as in the previously described calculation of y.

In the aforementioned procedure of calculating a fault point, a T equivalent circuit is written with respect to the branch point $b_2$ on the left end of the difference current equivalent circuit in FIG. 1(a). Thereafter, T equivalent circuits are written one after another with respect to the branch points $b_2$, $b_3$, $b_4$, ... until the fault point is located. However, in the present invention, a T equivalent circuit may first be written with respect to the branch point $b_{n-1}$ on the right end, and thereafter the T equivalent circuits are written one after another with respect to the branch points $b_2$, $b_3$, $b_4$, ... until the fault point is located. That is, a T equivalent circuit is first written with respect to an arbitrary branch point $b_k$ and thereafter T equivalent circuits are written one after another with respect to branch points $b_{k+1}$, $b_{k+2}$, $b_{k+3}$, ... and with respect to branch points $b_{k-1}$, $b_{k-2}$, $b_{k-3}$, ... until the fault point is located.

An embodiment of a fault localization for a parallel two-circuit transmission line according to the present invention will now be described in detail with reference to the accompanying drawings.

Figure 6:
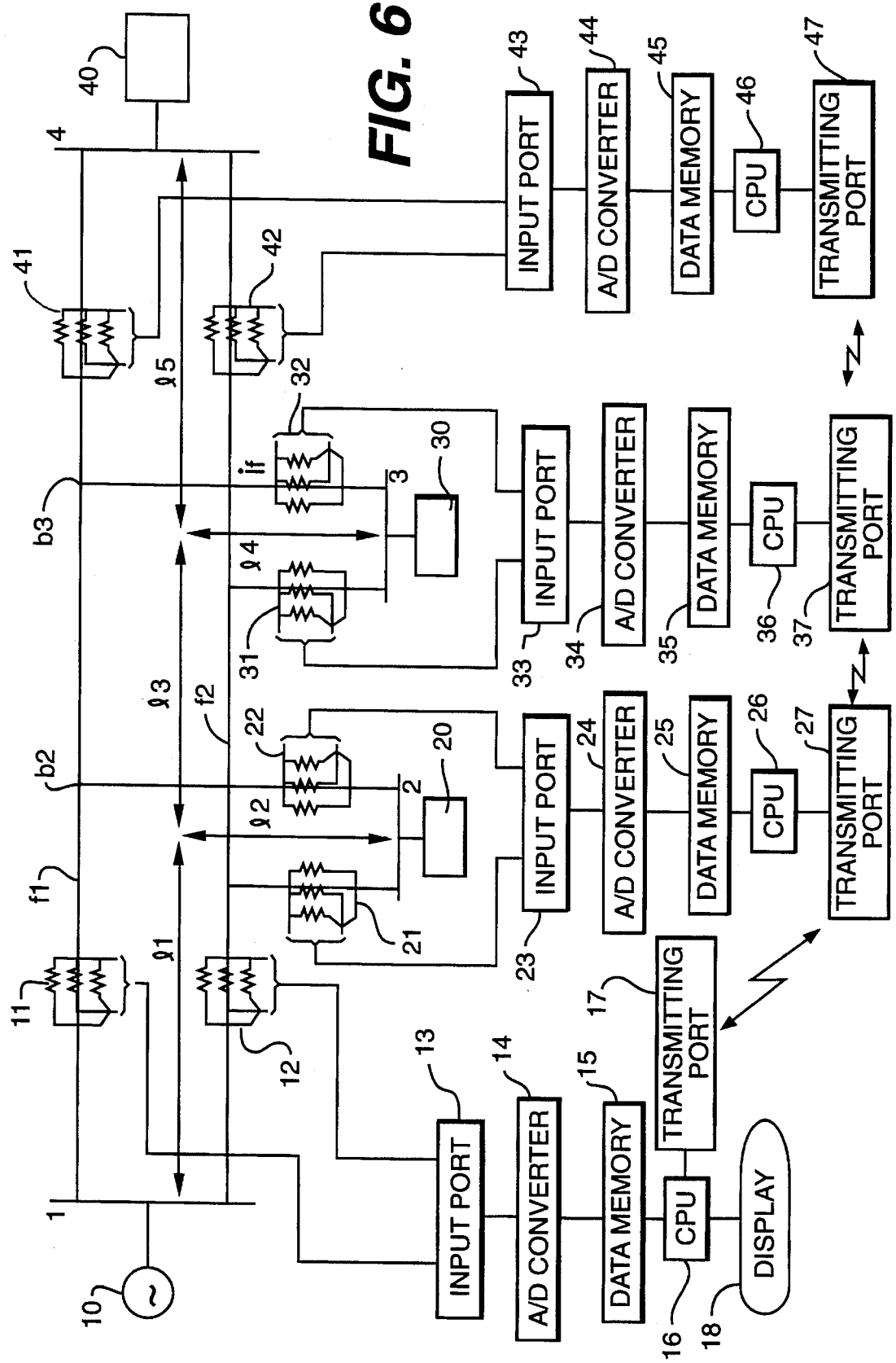
FIG. 6 is a skeleton diagram showing a four-terminal parallel two-circuit transmission line to which a fault localization method for an n-terminal parallel two-circuit transmission line according to the present invention is applied.

FIG. 6 shows a fault locator connected to a four-terminal parallel two-circuit transmission line to which a fault localization according to the present invention is applied. In FIG. 6, a main unit is connected with the line at the sending end 1 and terminal units at the receiving ends 2, 3, and 4.

The main unit at the sending end 1 includes a CT (current transformer) 11 for detecting the currents $I_{1a}$, $I_{1b}$, and $I_{1c}$ of the phases A, B, and C, respectively, of the circuit f1, a CT 12 for detecting the currents $I_{2a}$, $I_{2b}$, and $I_{2c}$ of the phases A, B, and C of the circuit f2, an input port 13 for receiving the currents $I_{1a}$, $I_{1b}$, and $I_{1c}$ detected by the CT 11, and $I_{2a}$, $I_{2b}$, $I_{2c}$ detected by CT 12 and for isolating these currents from each other using an auxiliary CT not shown, an A/D converter 14 for converting the current signal of a predetermined level from the input port 13 into a digital data at a predetermined sampling rate, a data memory 15 for storing the digital data converted by the A/D converter 14, a CPU 16 for performing an operation (later described) on the bases of the current data of the circuits f1 and f2 stored in the data memory 15 so as to detect the ground fault (the following explanation is based on the ground fault for example) on the parallel two-circuit and for calculating the location of a fault point on the basis of the aforementioned current data detected at the sending end and the current data supplied from the receiving ends 2–4, a data-transmitting/receiving port 17 for transmitting data to and receiving data from the receiving ends 2–4, and a displayer 18 for displaying information such as the distance to the fault point calculated by the CPU 16.

The receiving end 2 includes a CT 21 for detecting the currents $I_{1a}$, $I_{1b}$, and $I_{1c}$ of the phases A, B, and C, flowing in the circuit f1, a CT 22 for detecting the currents $I_{2a}$, $I_{2b}$, and $I_{2c}$ of the phase A, B, and C, respectively, flowing in the circuit f2, an input port 23 for performing the same task as the input port 13, an A/D converter 24, a data memory 25, a CPU 26, and a data-transmitting/receiving port 27.

The receiving end 3 is provided with a CT 31 for detecting the currents $I_{1a}$, $I_{1b}$, and $I_{1c}$ of the respective phases flowing in the circuit f1, a CT 32 for detecting the currents $I_{2a}$, $I_{2b}$, and $I_{2c}$ of the respective phases flowing the circuit f2, an input port 33 for performing the same task as the input port 13, an A/D converter 34, a data memory 35, a CPU 36, and a data-transmitting/receiving port 37.

The receiving end 4 is provided with a CT 41 for detecting the currents $I_{1a}$, $I_{1b}$, and $I_{1c}$ of the respective phases flowing in the circuit f1, a CT 42 for detecting the currents $I_{2a}$, $I_{2b}$, and $I_{2c}$ of the respective phases flowing the circuit f2, an input port 43, an A/D converter 44, a data memory 45, a CPU 46, and a data-transmitting/receiving port 47.

A fault localization apparatus of the above-described construction operates as follows:

The currents flowing in the circuits f1 and f2 at the terminals 1–4 detected by the CT's 11, 12, 21, 22, 32, 32, 41, and 42 are transformed into the corresponding current signals which in turn are converted into digital data at a predetermined sampling rate by the A/D convertors 4, 24, 34, and 44 and are then stored into the data memories 15, 25, 35, and 45.

Then, on the basis of the current data of the circuits f1 and f2 stored in the data memories 15, 25, 35, and 45, the CPU 16, 26, 36, and 46 calculate the positive-phase currents $I_{11}$, $I_{12}$, $I_{21}$, $I_{31}$, $I_{32}$, $I_{41}$, and $I_{42}$. Then, the respective CPUs 16, 26, 36, and 46 determine the zero-phase difference currents $\Delta I_1'$, $\Delta I_2$, $\Delta I_3$, and $\Delta I_4$, respectively, of the two circuits f1 and f2 using the following equations.

$$\Delta I_1 = I_{11} - I_{12}, \Delta I_2 = I_{21} - I_{22}$$

$$\Delta I_3 = I_{131} - I_{32}, \Delta I_4 = I_{41} - I_{42}.$$

When $\Delta I_1$ exceeds a predetermined value, the CPU 16 on the side of the sending end 1 recognizes that a fault has occurred, and requests the data-transmitting/receiving ports 27, 37, and 47 of sending to the data-transmitting/receiving port 17 the zero-phase current data $\Delta I_2$, $\Delta I_3$, and $\Delta I_4$ in the two circuits $f_1$ and $f_2$ detected at the receiving ends 2–4. Thus, the data $\Delta I_2$, $\Delta I_3$, and $\Delta I_4$ are sent from the data-transmitting/receiving ports 27, 37, and 47 to the CPU 16 via the data-transmitting/receiving ports 17.

The CPU 16 locates the fault using the $\Delta I_4$ calculated at the sending end 1 and the $\Delta I_2$, $\Delta I_3$, and $\Delta I_4$ of the receiving ends 2, 3, and 4 supplied through the transmitting/receiving port 17.

Hereinafter, the embodiment will be described assuming that an actual ground fault occurs between the receiving end 3 and the branch $b_3$ in FIG. 6 and a fault current $I_f$ is flowing (of course, one who is to locate the fault does not know where the ground fault actually is).

Figure 7:
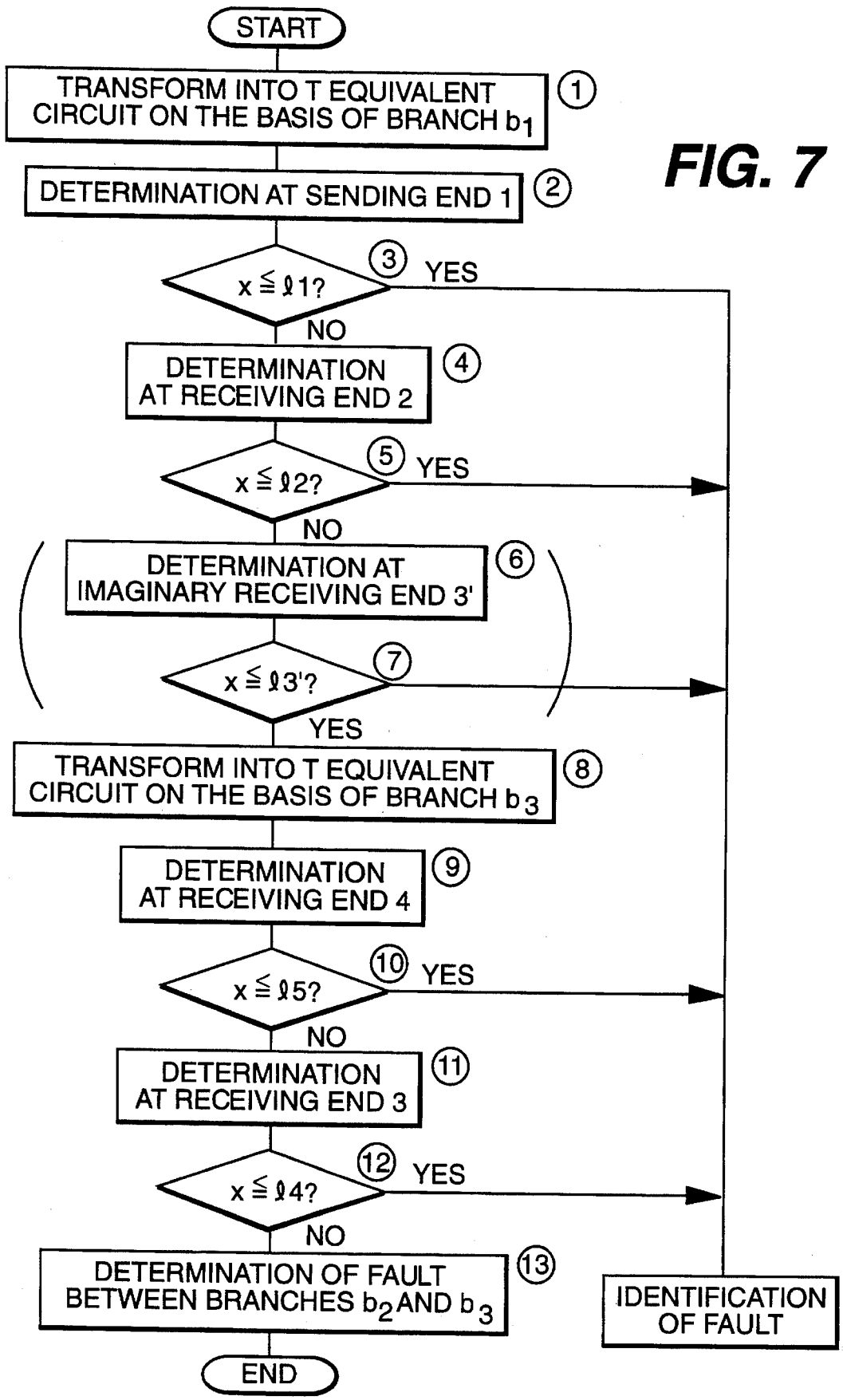
FIG. 7 is a flowchart illustrating the fault localization for the n-terminal parallel two-circuit transmission line in FIG. 6.
Figure 8:
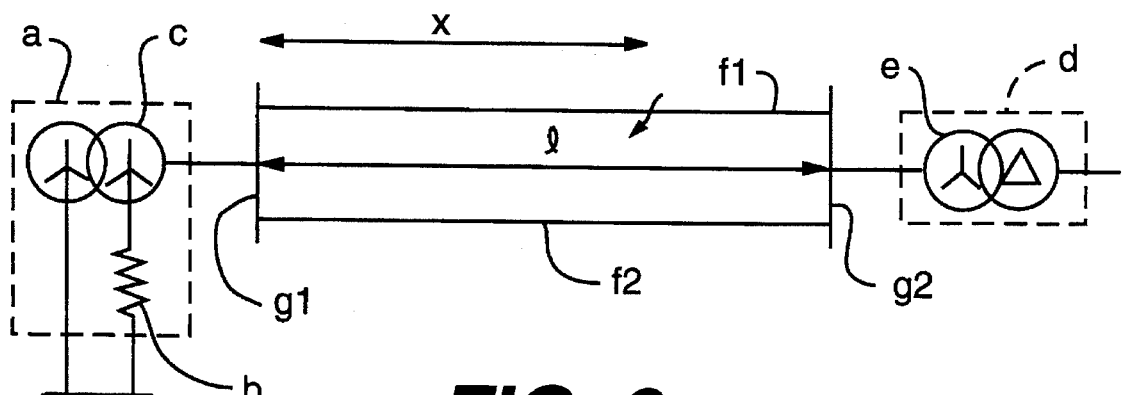
FIGS. 8, 9, 10(A), 10(B), 10(C), 10(D), 10(E), 11(A), 11(B), and 11(C) are circuit diagrams illustrating the fault localization of a second of a transmission line.
Figure 9:
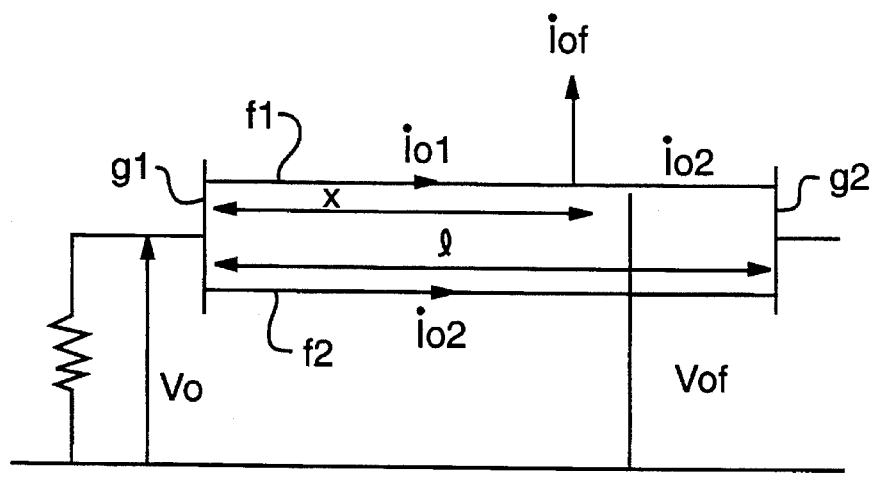

FIG. 7 is a flowchart showing the procedure for the aforementioned CPU 16 to locate a fault. At step 1, the inverted L type difference current circuit including the receiving ends 4, 3, and the branch $b_3$ is transformed into a linear equivalent circuit (imaginary distance is $l_3'$) having an imaginary receiving end 3' so as to form a T equivalent having the sending end I, receiving end 2, and imaginary end 3' (refer to FIG. 1(c)).

At step 2, the distance x to the fault point is determined by the equation $$x = \{L/(l_{2'} + l_{3'})\} \frac{(\Delta \dot{i}_2 + \Delta \dot{i}_{3'})}{(\Delta \dot{i}_2 + \Delta \dot{i}_{2'} + \Delta \dot{i}_{3'})}$$

If $x \leq l_1$ at step 3, then the fault is interpreted to exist between the sending end 1 and the branch $b_2$. Thus, x is the distance from the sending end 1 to the fault point.

If $x > l_1$, the procedure proceeds to step 4 to determine a distance to the fault point seen from the receiving end 2. If $x \leq l_2$, then the fault point should be between the receiving end 2 and the branch $b_2$. Thus, x is the distance from the receiving end 2 to the fault point. If $x > l_{2'}$ the procedure proceeds to steps 6 and 7. At step 6, the distance from the imaginary receiving end 3' to the fault point is determined and is then compared with the imaginary distance $l_3'$ at step 7. The fault point is decided as not being between the sending end 1 and the branch $b_2$ and not be between the receiving end 2 and the branch $b_2$. Thus, the fault point seems to theoretically exist within the imaginary distance $l_3'$ from the imaginary receiving end 3'. Thus, the fault point should be $x \leq l_3'$ in FIG. 6. In this sense, the steps 6 and 7 may be omitted.

At step 8, with respect to the branch $b_3$, the inverted L-type difference current circuit is transformed into a T equivalent circuit having the receiving ends 3 and 4 and imaginary terminal 2'. This T equivalent circuit is different from FIG. 1(d) in that the imaginary receiving end 4' is replaced with the true receiving end 4. This is because the embodiment in FIG. 6 assumes that the sending end has only two branches $b_2$ and $b_3$. At step 9, the distance x from the receiving end 4 to the fault is calculated. At step 10, if the distance x is $x < l_5$, then the fault port can be expected to be between the branch $b_3$ and the receiving end 4. If $x > l_5$, then a decision is made where the fault is with reference to the receiving end 3 at step 11. At step 12, if x is smaller than $l_4$, x may be interpreted to exist the distance from the receiving end 3 to the fault point. The embodiment was set such that the fault exists between the receiving end 3 and the branch 3, thus "YES" was selected at step 12.

If $x > l_4$ at step 12, then the fault may be interpreted to be occurring between the branches $b_2$ and $b_3$, and the distance y from the branch $b_2$ to the fault can be determined by an equation $y = x - (l_{2'} - l_3)$ through the uses of the calculated distance x to the fault from the imaginary terminal 2' and the imaginary distances $l_{2'}$ and $l_3$.

According to the present invention, when the fault exists in a section from any one of the receiving ends, 2, 3, . . . , n−1 to the branches $b_2, b_3, \ldots b_{n-1}$, the distance x from the receiving end to the fault can be determined. When the fault exists from the branch $b_k$ to $b_{k+1}$, the fault can be located in this section and therefore the distance y from the branch $b_k$ may be determined. Thus, the ground fault point in the ordinary n terminal parallel two-circuit transmission line may be located exactly using the current information on the respective terminals.

What is claimed:

1. A method of locating where a fault lies in a parallel, two-circuit transmission line in an n-terminal system, having at least a sending end and a receiving end, and further having a plurality of circuits and a plurality of branches connected to the transmission line at branch points, the method comprising the steps of:

detecting physical current signals of each phase of each end of each circuit of the parallel, two-circuit transmission line;

converting each detected physical current signal into digital data;

storing the digital data in a memory;

transmitting the digital data stored in said memory to a predetermined main station;

storing the transmitted digital data of currents of all the ends in a memory in said main station which also contains connection information of the n-terminal system and data about the lengths of different portions of the transmission line;

determining, by the main station, a distance to the fault from one of the ends of the transmission line based on the connection information of the system and the data about the lengths of the transmission line portions, the distance determining step including the substeps of:

(a) performing equivalent transformation with respect to a branch point $b_k$ of said parallel two-circuit transmission line, to transform said transmission line into a T three-terminal parallel two-circuit transmission line circuit having three terminals $T_{k-1}$, $T_k$, and $T_{k+1}$, said equivalent circuit including at least one branch $B_k$ having a length on the equivalent circuit indicative of a distance from said branch point $b_k$ to a first terminal connected to the branch point, $b_k$, (b) setting a value $x_k$ as a length on the equivalent circuit from said first terminal connected to said branch point $b_k$ to the fault on the equivalent circuit, on the basis of said branch lengths and said detected current signals flowing out of terminals $T_{k-1}$, $T_k$, and $T_{k+1}$, (c) if $x_k$ is less than the length on the equivalent circuit of said branch $B_k$, identifying the value $x_k$ as the closest distance on the parallel two-circuit transmission line from said first terminal to the fault, (d) if $x_k$ is not less than the length on the equivalent circuit of said branch $B_k$, setting a value $x_{k-1}$ to a length on the equivalent circuit from a terminal connected to a branch $B_{k-1}$ to the point on the basis of said branch lengths and said detected current signals flowing out of terminals $T_{k-1}$, $T_k$, and $T_{k+1}$, (e) if $x_{k-1}$ is less than a length on the equivalent circuit of branch $B_{k-1}$, and if the branch point $b_k$ is connected to a second terminals with no branch points therebetween, identifying $x_{k-1}$ as the closest distance from said second terminal to the fault, (f) if $x_{k-1}$ is less than the length on the equivalent circuit of branch $B_{k-1}$ and if the branch point $b_k$ is not connected to a second terminal with no branch points therebetween, decrementing k by 1 and repeating steps (b)–(f), (g) if $x_{k-1}$ is not less than the length on the equivalent circuit of said branch $B_{k-1}$, setting a value $x_{k+1}$ to a length on the equivalent circuit from a terminal connected to a branch $B_{k+1}$ to the fault on the basis of said branch lengths and said detected current signals flowing out of terminals $T_{k-1}$, $T_k$, and $T_{k+1}$, (h) if $x_{k+1}$ is less than a length on the equivalent circuit of branch $B_{k+1}$ and if the branch point $b_k$ is connected to a third terminal with no branch points therebetween, identifying $x_{k+1}$ as the closest distance from said third terminal to the fault, and (i) if $x_{k+1}$ is less than the length on the equivalent circuit of branch $B_{k+1}$ and if the branch point $b_k$ is not connected to a third terminal with no branch points therebetween, incrementing k by 1 and repeating steps (b), (c), and (g)–(i); and locating the fault using the closest distance identified in the distance determining step.

2. The method of claim 1, wherein the step of calculating the value $x_k$ includes the step of using the equation $$x_k = \{L/(l_{k+1} + l_{k-1})\} \times \frac{(\Delta \dot{I}_{k+1} + \Delta \dot{I}_{k-1})}{(\Delta \dot{I}_{k-1} + \Delta \dot{I}_k + \Delta \dot{I}_{k+1})}$$

where $l_{k-1}$ is the length of the branch $B_{k-1}$, $l_k$ is the length of the branch $B_k$, $l_{k+1}$ is the length of the branch $B_{k+1}$, L is $l_{k-1}l_k + l_k l_{k+1} + l_{k+1}l_{k-1}$ and $\Delta I_{k-1}$, $\Delta I_k$, and $\Delta I_{k+1}$ are difference currents flowing out of terminals $T_{k-1}$, $T_k$, and $T_{k+1}$, respectively.

3. The method of claim 1, wherein the step of calculating the value of $x_k$ includes the step of calculating the value $x_k$ on the basis of difference currents, said difference currents being one of zero sequence, positive sequence, reverse sequence, and phase currents, whichever is involved in the fault.

4. The method of claim 1, wherein the step of calculating the value $x_{k-1}$ includes the step of using the equation $$x_{k-1} = \{L/(l_k + l_{k+1})\} \times \frac{(\Delta \dot{I}_k + \Delta \dot{I}_{k+1})}{(\Delta \dot{I}_{k-1} + \Delta \dot{I}_k + \Delta \dot{I}_{k+1})}$$

wherein $l_{k-1}$ is the length of the branch $B_{k-1}$, $l_k$ is the length of the branch $B_k$, $l_{k+1}$ is the length of the branch $B_{k+1}$, L is $l_{k-1}l_k + l_k l_{k+1} + l_{k+1}l_{k-1}$ and $\Delta I_{k-1}$, $\Delta I_k$, and $\Delta I_{k+1}$ are difference currents flowing out of terminals $T_{k-1}$, $T_k$, and $T_{k+1}$, respectively.

5. The method of claim 1, wherein the step of calculating the value of $X_{k+1}$ includes the step of using the equation $$x_{k+1} = \{L/(l_k + l_{k-1})\} \times \frac{(\Delta \dot{I}_k + \Delta \dot{I}_{k-1})}{(\Delta \dot{I}_{k-1} + \Delta \dot{I}_k + \Delta \dot{I}_{k+1})}$$

where $l_{k-1}$ is the length of the branch $B_{k-1}$, $l_k$ is the length of the branch $B_k$, $l_{k+1}$ is the length of the branch $B_{k+1}$, L is $l_{k-1}l_k + l_k l_{k+1} + l_{k+1}l_{k-1}$ and $\Delta I_{k-1}$, $\Delta I_k$, and $\Delta I_{k+1}$ are different currents flowing out of terminals $T_{k-1}$, $T_k$, and $T_{k+1}$, respectively.

6. A method of locating where a fault lies in a parallel, two-circuit transmission line in an n-terminal system, having at least a sending end and a receiving end a plurality of circuits and a plurality of branches connected to the transmission line at branch points, the method comprising the steps of:

detecting physical current signals of each phase of each end of said circuit of the parallel, two-circuit transmission line;

converting each detected physical current signal into digital data;

storing the digital data in a memory;

transmitting the digital data stored in said memory to a predetermined main station;

storing the transmitted digital data of currents of all the ends in a memory in said main station which also contains connection information of the n-terminal system and data about the lengths of different portions of the transmission line;

determining, by the main station, a distance to the fault from one of the ends of the transmission line based on the connected information of the system and the data about lengths of the transmission line portions, the distance determining step including the substeps of:

(a) performing equivalent transformation with respect to a branch point $b_k$ of said parallel two-circuit transmission line, to transform said transmission line into a T three-terminal parallel two-circuit transmission line circuit having three terminals $T_{k-1}$, $T_k$, and $T_{k+1}$, said equivalent circuit indicative of a distance from a branch point $b_k$ to a first terminal connected to said branch point $b_k$, (b) setting a value $x_k$ as a length on the equivalent circuit from a terminal connected to said branch $B_k$ to the fault on the equivalent circuit, on the basis of said branch lengths and said detected current signals flowing out of terminals $T_{k-1}$, $T_k$, and $T_{k+1}$, (c) if $x_k$ is less than the length on the equivalent circuit of said branch $B_k$, identifying the value of $x_k$ as the closest distance on the parallel two-circuit transmission line from said first terminal connected with said branch point $b_k$ to the fault, (d) is $x_k$ is not less than the length on the equivalent circuit of said branch $B_k$, setting a value $x_{k-1}$ as a length on the equivalent circuit from a terminal connected to a branch $B_{k-1}$ to the fault on the basis of said branch lengths and said detected current signals flowing out of terminals $T_{k-1}$, $T_k$, and $T_{k+1}$, (e) if $x_{k-1}$ is less than the length on the equivalent circuit of branch $B_{k-1}$ and if the branch point $b_k$ is connected to a second terminals with no branch points therebetween, identifying $x_{k-1}$ as the closes distance from said second terminals to the fault, (f) if $x_{k-1}$ is less than the length on the equivalent circuit of branch $B_{k-1}$ and if the branch point $b_k$ is not connected to a second terminal with no branch points therebetween, performing equivalent transformation of the parallel two-circuit transmission line with respect to a branch point $b_{k-1}$, to transform said transmission line into a T three-terminal parallel two-circuit transmission line circuit having three terminals $T_{k-2}$, $T_{k-1}$, and $T_k$, said equivalent circuit including at least one branch $B_{k-1}$ having a length on the equivalent circuit indicative of a distance from said branch point $b_{k-1}$ to a first terminal connected with said branch point $b_{k-1}$, this substep including the additional substeps of (f1) setting a value $x_{k-1}$ representing a length in the equivalent circuit from a terminal connected to said branch $B_{k-1}$ to the fault on the equivalent circuit, on the basis of said branch lengths and said detected signals flowing out of terminals $T_{k-2}$, $T_{k-1}$, and $T_k$, (f2) is $x_{k-1}$ is less than the length on the equivalent circuit of said branch $B_{k-1}$, identifying the value $x_{k-1}$ as the closest distance on the parallel two-circuit transmission line from said first terminal, connected with said branch point $b_{k-1}$, to the fault, (f3) if $x_{k-1}$ is not less than the length on the equivalent circuit of said branch $B_{k-1}$, setting a value $x_k$ as a length on the equivalent circuit from a terminal connected to branch $B_k$ to the fault on the basis of difference currents, (f4) is $x_k$ is less than the length on the equivalent circuit of said branch $B_k$, calculating the distance from said branch point $b_{k-1}$ to said fault on the basis of said branch lengths and said detected signals flowing out of terminals $T_{k-2}$, $T_{k-1}$, and $T_k$, (f5) if $x_k$ is not less than the length on the equivalent circuit of said branch $B_k$, setting a value $x_{k-2}$ representing a length on the equivalent circuit from a terminal connected to a branch $B_{k-2}$ to the fault on the basis of said difference currents, (f6) if $x_{k-2}$ is less than the length on the equivalent circuit of branch $B_{k-2}$, and if the branch point $b_{k-1}$ is connected to a second terminal with no branch points therebetween, identifying $x_{k-2}$ as the closest distance from said second terminal to the fault, (f7) if $x_{k-2}$ is not less than the length on the equivalent circuit of branch $B_{k-2}$ and if the branch point $b_{k-1}$ is not connected to a second terminal with no branch nodes therebetween, performing equivalent transformation of the parallel two-circuit transmission line with respect to the branch point $b_{k-2}$, to transform said transmission line into a T three-terminal parallel two-circuit transmission line circuit having three terminals $T_{k-3}$, $T_{k-2}$, and $T_{k-1}$, said equivalent circuit including at least one branch $B_{k-2}$ having a length on the equivalent circuit indicative of a distance from said branch point $b_{k-2}$ to a first terminals connected to branch point $b_{k-2}$, and (f8) decrementing k by one and repeating steps (f1)–(f8) until the closest distance to the fault is identified, (g) if $x_{k-1}$ is not less than the length on the equivalent circuit of branch $B_{k-1}$ and if the branch point $b_k$ is connected to a second terminals with no branch points therebetween, setting a value $x_{k+1}$ as a length on the equivalent circuit from a terminal connected to branch $B_{k+1}$ to the fault on the basis of said branch lengths and said detected signals flowing out of terminals $T_{k-3}$, $T_{k-2}$, and $T_{k-1}$ and identifying $x_{k+1}$ as the closest distance from said second terminal to the fault; and (h) if $x_{k-1}$ is not less than the length on the equivalent circuit of branch $B_{k-1}$ and if the branch point $b_k$ is not connected to a second terminal with no branch points therebetween, incrementing k by one; and locating the fault point using the closest distance identified in the distance determining step.

* * * * *

UNITED STATES PATENT AND TRADEMARK OFFICE
CERTIFICATE OF CORRECTION

PATENT NO. : 5,485,394
DATED : January 16, 1996
INVENTOR(S) : Kenji MURATA et al.

Sheet 1 of 2

It is certified that error appears in the above-indentified patent and that said Letters Patent is hereby corrected as shown below:

Claim 1, column 15, line 56, "terminals" should read --terminal--.

Claim 4, column 16, line 41, "$\Delta I_{k-1}, \Delta I_k, \Delta I_{k+1}$" should read --$\Delta \dot{I}_{k-1}, \Delta \dot{I}_k, \Delta \dot{I}_{k+1}$--.

Claim 6, column 17, line 11, "connected" should read --connection--.

Claim 6, column 17, line 42, "closes" should read --closest--.

Claim 6, column 18, line 40, "terminals" should read --terminal--.

UNITED STATES PATENT AND TRADEMARK OFFICE
CERTIFICATE OF CORRECTION

PATENT NO. : 5,485,394
DATED : January 16, 1996
INVENTOR(S) : Kenji MURATA et al.

Sheet 2 of 2

It is certified that error appears in the above-indentified patent and that said Letters Patent is hereby corrected as shown below:

Claim 6, column 18, line 47, "terminals" should read --terminal--.

Signed and Sealed this

Nineteenth Day of August, 1997

Attest:

BRUCE LEHMAN

Attesting Officer

Commissioner of Patents and Trademarks